United States Patent [19]
Jones, Jr. et al.

[11] Patent Number: 5,838,221
[45] Date of Patent: Nov. 17, 1998

[54] MOTOR CONTROL SYSTEM AND CONTROL HEAD

[75] Inventors: Barry M. Jones, Jr., Logansport; Michael Louis Molinari, Kokomo; Duane Eugene Whitson, Amboy, all of Ind.

[73] Assignee: Delco Electronics Corporation, Kokomo, Ind.

[21] Appl. No.: 593,780

[22] Filed: Jan. 29, 1996

[51] Int. Cl.$^6$ .................................................. H01C 10/26
[52] U.S. Cl. ......................... 338/152; 338/118; 338/150; 338/160; 338/163
[58] Field of Search .................................. 338/13, 14, 20, 338/29, 31, 43, 45, 47, 68, 73, 87, 99, 100, 118–123, 126, 127, 132, 134, 147, 162, 163, 166, 167, 168, 170–173, 182, 22 R, 174

[56] References Cited

U.S. PATENT DOCUMENTS

| | | | |
|---|---|---|---|
| 2,873,336 | 2/1959 | Tassara | 338/22 R |
| 4,184,140 | 1/1980 | Frey, Jr. et al. | 338/174 |
| 4,477,795 | 10/1984 | Henmi et al. | 338/163 |
| 5,546,067 | 8/1996 | Schmidt et al. | 338/172 |

*Primary Examiner*—Tu B. Hoang
*Attorney, Agent, or Firm*—Jimmy L. Funke

[57] ABSTRACT

A control head for remote actuators on a vehicle heater/air conditioner system comprises variable resistors operated by control knobs to provide variable motor control voltages to the actuators which comprise servo-actuators or a pulse width modulated blower motor. The control head has a molded plastic housing with embedded conductive runners terminating in wipers. A control disk rotatable with each knob has an arcuate resistive film and a pair of arcuate conductors connected to ends of the film. The wipers engage the arcuate elements to apply a supply voltage to the conductors and pick off a control voltage from the resistive film. Alternatively the arcuate elements are on the housing and the wiper is on the control disk.

11 Claims, 2 Drawing Sheets

MOTOR CONTROL SYSTEM AND CONTROL HEAD

FIELD OF THE INVENTION

This invention relates to a system of remotely controlled actuators or motors and a manually operated control head and particularly to a simplified control apparatus for electric actuators.

BACKGROUND OF THE INVENTION

Automotive heater and air conditioner assemblies typically have a control head mounted on the vehicle instrument panel for convenient driver operation for control of a remote heater, evaporator and blower assembly (HEBA). The HEBA has a blower, mixer doors to control the mix of hot and cold air and the mode of air flow. In many vehicles the blower motor is controlled by a bank of resistors selected by a high current switch and by a high blower relay. The doors are controlled by cables extending from the control head to the HEBA.

The control head typically would require a printed circuit, switches, electronics and cable operator mechanisms. It is desirable from the standpoint of simplicity, cost and reliability to minimize the number of parts and the diversity of parts needed to accomplish the control function.

SUMMARY OF THE INVENTION

It is therefore an object of the invention to simplify the controls of a heater and air conditioner assembly or other system having actuators remote from a control station. Another object in such a system to use electric motor actuators for various functions with common controller designs. A further object is to reduce the complexity of a control head.

A control head has variable resistors controlled by knobs for producing variable control voltages. Servo-actuators responsive to the control voltages are mounted on the HEBA to position mode, temperature and air inlet doors, and a pulse width modulated controller operates a blower motor at a speed dependent on a control voltage.

The control head has a molded housing containing conductive runners extending from a connector to a control location in line with each knob. The connector terminals receive a supply voltage from a wiring harness and supply control voltages to the actuators on the HEBA. At the control locations the runners terminate in wipers extending above the surface of the housing. A knob aligned with each location is mounted for rotation and carries a plate or disk in contact with wipers. The disk has two arcuate conductors and an arcuate resistive film concentric with the knob axis. The conductors are each connected to an end of the resistive film. The wipers contact the arcuate elements to carry a supply voltage to the conductors and to pick off a voltage from the variable resistor which varies according to knob position. A detent arrangement in each disk includes a depression for each desired knob position and a spring biased detent on the housing to engage the depressions.

Alternatively, the arcuate resistive film may be formed on the housing and connected at its ends to runners, an adjacent arcuate conductor on the housing is connected to a runner, and a wiper on the disk engages the resistive film according to knob position and bridges the film and the conductor, so that a variable voltage is picked off the resistive film and transferred to the arcuate conductor and its associated runner.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed to the control of an automotive heater/air conditioner system, the invention applies generally to a control head for developing a variable control voltage, and further the invention applies to electrical control of actuators remote from a control head.

Figure 1:
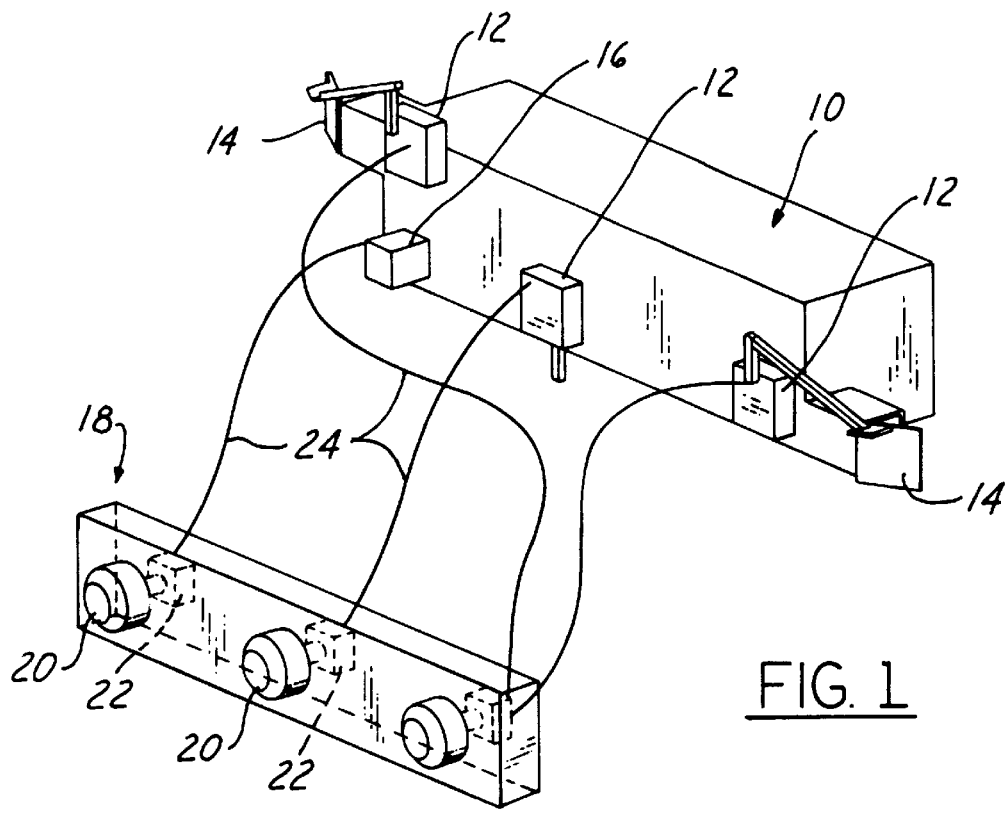
FIG. 1 is a schematic view of a control head and remote actuator system according to the invention as applied to a heater/air conditioner installation.
Figure 2:
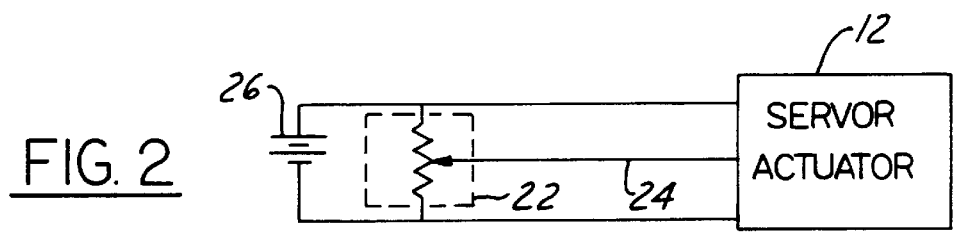
FIG. 2 is a schematic circuit illustrating the control arrangement for the system of FIG. 1.

Referring to FIG. 1, a HEBA 10 for conditioning air and managing airflow includes servo-actuators 12 which operate doors 14 and a pulse width modulated blower assembly 16. A control head 18 has knobs 20 which actuate variable resistor modules 22 to provide variable voltage control signals via control lines 24 to the HEBA servo-actuators 12 and blower assembly 16. As shown in FIG. 2 for one control, a vehicle battery 26 and a ground connection supply voltage to the resistor modules 22 and the servo-actuators 12. The resistor module is essentially a potentiometer with its variable center tap connected to the control line 24 which is coupled to the servo-actuator 12. The servo-actuator, as is well known, drives its output shaft to a position dependent on the control voltage. Where the controlled device is the blower assembly 16, the blower motor speed is controlled according to the control voltage by pulse width modulation techniques.

Figure 3:
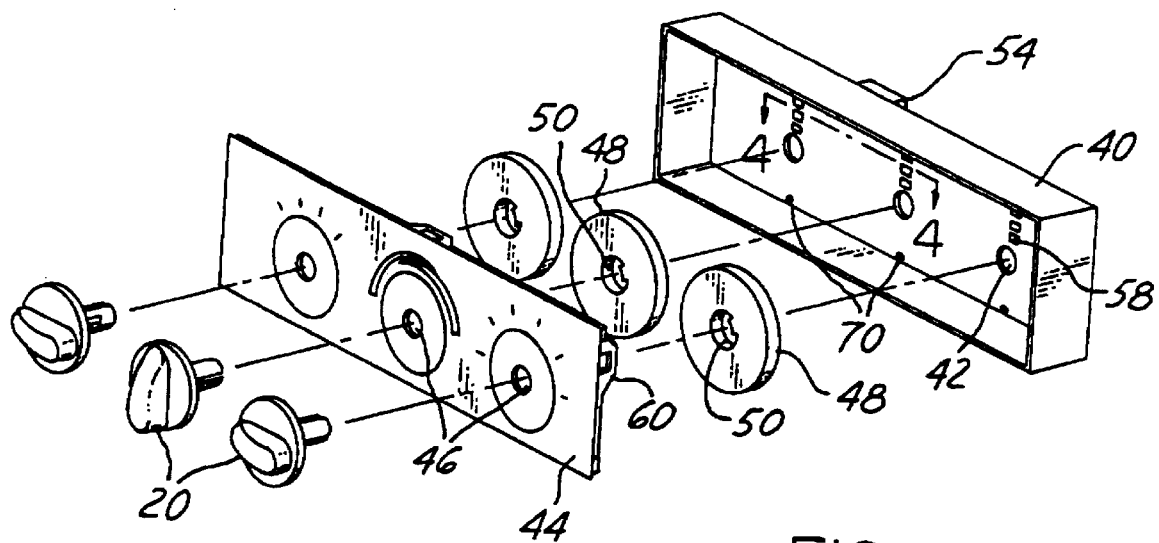
FIG. 3 is an exploded view of a control head according to the invention.

In FIG. 3 the control head 18 for controlling blower speed, temperature, and mode includes a housing 40 with three control sites having apertures 42, a face plate 44 with three corresponding holes 46, three knobs 20 which fit through the holes 46 and apertures 42 for rotation therein about an axis, and corresponding control plates or disks 48 each with a central opening 50 to accept a knob and keyed to turn with the knob.

Figure 4:
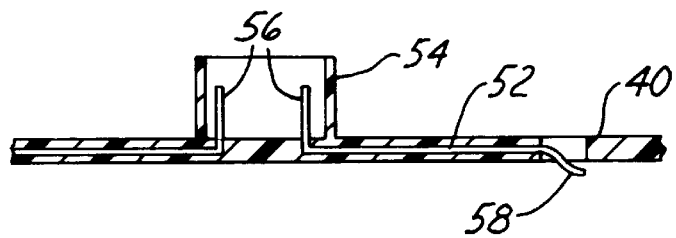
FIG. 4 is a sectional view taken along line 4—4 of FIG. 3.

The housing 40 is molded plastic with embedded copper runners 52 extending from a connector 54 to the control locations. The runners are, for example, less than ⅛ inch wide and 0.006 to 0.02 inch thick. One end of each runner is bent outward to form a terminal pin 56 in the connector 54, as shown in FIG. 4, and the ends adjacent the control locations are formed to extend above the housing surface to serve as contacts or wipers 58. Preferably each wiper is split into three fingers for improved contact with a control disk. Each control location has three wipers connected respectively to battery, ground and one of the control lines 24. The housing has an open side which is covered by the face plate 44; fastener details 60 on the face plate are formed to snap onto corresponding tabs, not shown, on the housing. The housing cavity contains the three control disks 40.

Figure 5:
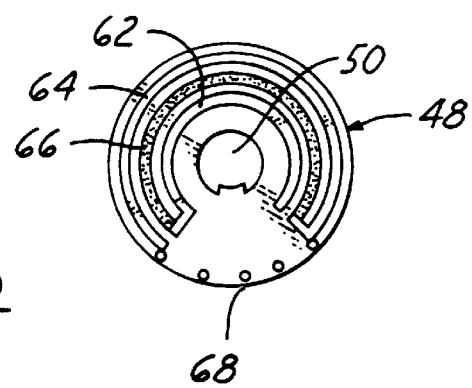
FIG. 5 is a rear view of a control disk for the control head of FIG. 3.

Each control disk 48 is formed of plastic or ceramic and, as shown in FIG. 5, the side nearest the wipers 58 contains three arcuate conductive paths concentric with the knob axis of rotation and each in wiping contact with a wiper 58. The inner path 62 and the outer path 64 are copper conductors connected to the supply voltage and ground through the respective wipers 58. The center path is a resistive film 66 connected at one end to the inner path 62 and at the other end to the outer path 64, so that the supply voltage is applied across the resistance. The resistive film is a carbon ink trace. The resistive film 66 is contacted by the third wiper 58 which is connected to a control line 24. Thus as the disk turns with the knob the voltage sensed by the wiper on the resistive film varies. If particular stop positions of the disk are desired, a number of recesses 68 are formed along the disk outer margin, one for each position, and a spring loaded detent 70 is installed in the housing to engage each of the recesses as the disk is turned.

It will thus be seen that the improved control head provides a control voltage for a remote actuator and requires no circuit board, switches, relays or electronics, thereby assuring simplicity and reliability. There is also considerable flexibility in manufacture. If different models of the control head require different resistance, different knob rotation range, or different detent settings, for example, it is only necessary to substitute a differently designed disk, the housing and other structure remaining the same. While the disk is shown as separate from the knob, they can be formed as one piece.

Figure 6:
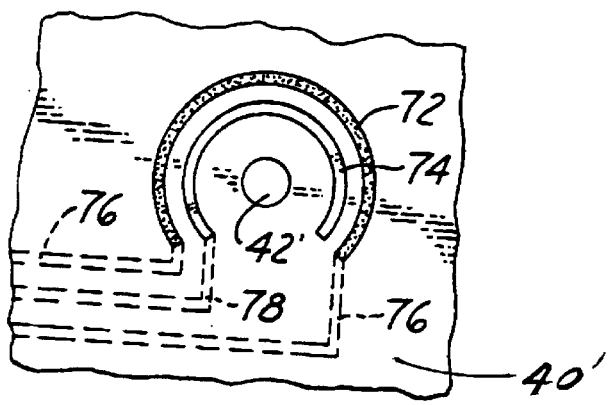
FIG. 6 is a partial view of a housing for a second embodiment of the invention.
Figure 7:
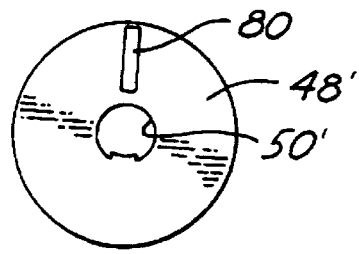
FIG. 7 is a rear view of a control disk for the second embodiment of the invention.

Another embodiment of the control head is like that of FIG. 3 but reverses the role of the disk and the wipers; a wiper is installed on the disk and the resistive film and a conductor path are formed on the housing. FIG. 6 shows a portion of a housing 40' having an aperture 42' to receive a knob, an arcuate resistive film 72 and an arcuate copper trace 74 concentric with the aperture. Runners 76 embedded in the housing 40' connect to opposite ends of the resistive film 72 to apply a voltage across the film, and a runner 78 in the housing connects to the copper trace 74. An insulating disk 48', shown in FIG. 7 has a central aperture 50' to fit on the knob and a conductive wiper 80 extending radially along the disk. The wiper bridges the resistive film 72 and the copper trace 74 to vary the voltage on the copper trace 74 and the runner 78 upon knob rotation.

The embodiments of the invention in which an exclusive property or privilege is claimed are defined as follows:

1. A control head for producing a variable control voltage comprising:

a control housing;

a first conductor in the housing for carrying the control voltage and second conductors in the housing for carrying supply voltage, the second conductors extending from a connector on the housing to first control means on the housing;

a face plate attached to the housing;

a manually rotatable controlled knob mounted for movement on the face plate and having a second control means engaging the first control means;

the second control means having an elongated resistive film, the film having ends coupled via the first control means to the second conductors to receive the supply voltage; and the first control means having first wiper means connected to the first conductor and engaging the resistive film whereby movement of the knob effects movement of the resistive film across the first wiper means to vary the voltage on the first conductor.

2. The control head as defined in claim 1 wherein:

the knob is mounted for rotary movement; and a disk on the knob carries the second control means for rotation with the knob.

3. The control head as defined in claim 1 wherein:

the first control means on the housing includes second wiper means connected to the second conductors; and the second control means having the resistive film arranged for slidably engaging the first wiper means, and a pair of conductive paths slidably engaging the second wiper means and connected to opposite ends of the resistive film to couple the second conductors across the resistive film.

4. The control head as defined in claim 1 wherein:

the knob is mounted for rotation about an axis;

the first control means on the housing includes second wiper means connected to the second conductors; and the second control means having the resistive film arranged in an arc concentric with the axis for slidably engaging the first wiper means upon knob rotation, and a pair of arcuate conductive paths concentric with the axis for slidably engaging the second wiper means and connected to opposite ends of the resistive film to couple the second conductors across the resistive film.

5. The control head as defined in claim 4 wherein:

a disk of insulating material carried by the knob for rotation with the knob carries the second control means.

6. The control head as defined in claim 1 wherein:

the second control means includes a plurality of detent stops; and a biased detent mechanism on the housing engages the detent stops upon movement of the knob to establish preferred positions of the second control in its range of movement.

7. The invention as defined in claim 1 wherein the housing is molded plastic and the conductors extending from the connector on the housing to the first control means are embedded in the housing.

8. The control head as defined in claim 1 wherein:

the housing is molded plastic and the conductors extending from the connector on the housing to the first control means are embedded in the housing; and at the first control means each conductor terminates in a wiper portion which extends out of the housing surface for conductive contact with the second control means.

9. A motor control system comprising:

a power supply;

a remote motor coupled to the power supply and responsive to a variable control voltage;

a control head connected to the power supply for producing the variable control voltage;

the control head having a housing including a connector for coupling to the power supply and to the motor;

conductors in the housing connected to the power supply and to the motor, the conductors extending from the connector to respective wipers;

an actuator for the control head having a manually rotatable operated knob and a plate movable with the knob; and a resistor circuit on the plate and in sliding contact with the wipers for developing the variable control voltage.

10. The motor control system as defined in claim 9 wherein:

the resistor circuit comprises an elongated resistive path connected at each end to an elongated conductor, wherein the resistive path and the conductors are in sliding contact with the wipers.

11. The motor control system as defined in claim 9 wherein:

the knob is mounted for rotation;

the resistor circuit comprises an elongated arcuate resistive path connected at each end to an elongated arcuate conductor, wherein the resistive path and the conductors are in sliding contact with the wipers.

\* \* \* \* \*